United States Patent
Richter et al.

(10) Patent No.: US 9,440,384 B2
(45) Date of Patent: Sep. 13, 2016

(54) BATTERY ACID STATUS INDICATOR AND METHOD FOR PRODUCTION THEREOF

(75) Inventors: Gerolf Richter, Ottersberg-Fischerhude (DE); Peter Streuer, Hannover (DE)

(73) Assignee: Johnson Controls Autobatterie GmbH & Co. KGAA, Hannover (DE)

( * ) Notice: Subject to any disclaimer, the term of this patent is extended or adjusted under 35 U.S.C. 154(b) by 807 days.

(21) Appl. No.: 12/513,821

(22) PCT Filed: Oct. 24, 2007

(86) PCT No.: PCT/DE2007/001924
§ 371 (c)(1),
(2), (4) Date: May 6, 2009

(87) PCT Pub. No.: WO2008/055470
PCT Pub. Date: May 15, 2008

(65) Prior Publication Data
US 2010/0047675 A1 Feb. 25, 2010

(30) Foreign Application Priority Data

Nov. 6, 2006 (DE) .................. 10 2006 052 524

(51) Int. Cl.
*B29C 45/16* (2006.01)
*H01M 10/48* (2006.01)
*H01M 2/04* (2006.01)
*H01M 10/06* (2006.01)

(52) U.S. Cl.
CPC ............ *B29C 45/1657* (2013.01); *H01M 2/04* (2013.01); *H01M 2/0434* (2013.01); *H01M 10/06* (2013.01); *H01M 10/48* (2013.01); *H01M 10/484* (2013.01); *H01M 10/488* (2013.01); *Y02E 60/126* (2013.01); *Y02P 70/54* (2015.11); *Y10T 29/49108* (2015.01)

(58) Field of Classification Search
CPC ...................................... H01M 10/48
USPC ...................................... 429/90, 91
See application file for complete search history.

(56) References Cited

U.S. PATENT DOCUMENTS

| 2,400,228 | A | * | 5/1946 | Franz et al. ............. 429/91 |
| 3,597,973 | A | * | 8/1971 | Ryder .............. G01F 23/2922 73/291 |
| 3,932,038 | A | | 1/1976 | Schweizer et al. |
| 4,874,679 | A | * | 10/1989 | Miyagawa .......... H01M 10/484 429/91 |
| 4,913,987 | A | | 4/1990 | Dattilo |
| 5,180,643 | A | * | 1/1993 | Nedbal ............. G01F 23/2922 215/355 |
| 2006/0141342 | A1 | * | 6/2006 | Marconi ............. H01M 2/1205 429/86 |

FOREIGN PATENT DOCUMENTS

DE    78 22 820 U1    6/1980
DE   298 08 883 U1    7/1998
(Continued)

OTHER PUBLICATIONS

International Search Report and Written Opinion from the International Searching Authority, dated Apr. 8, 2008, received in connection with PCT/DE07/001924 filed Oct. 24, 2007, 9 pages.

*Primary Examiner* — Scott J Chmielecki
(74) *Attorney, Agent, or Firm* — Boardman & Clark LLP

(57) ABSTRACT

An acid status indicator for a battery, in particular for a lead-acid rechargeable battery, having a sight glass and a holder for holding the sight glass and for attaching the acid status indicator to a housing of the battery, wherein the sight glass and the holder are produced by two-component injection molding, with the holder being produced by insert molding of the sight glass.

13 Claims, 1 Drawing Sheet

(56) References Cited

FOREIGN PATENT DOCUMENTS

| DE | 298 21 994 U1 | 2/1999 |
| DE | 202 20 044 U1 | 3/2003 |
| DE | 202 18 730 U1 | 7/2003 |
| DE | 20 2005 019 009 U1 | 2/2006 |
| EP | 1 432 061 A1 | 6/2004 |
| EP | 1 633 008 A1 | 3/2006 |
| GB | 1 381 220 A | 1/1975 |

* cited by examiner

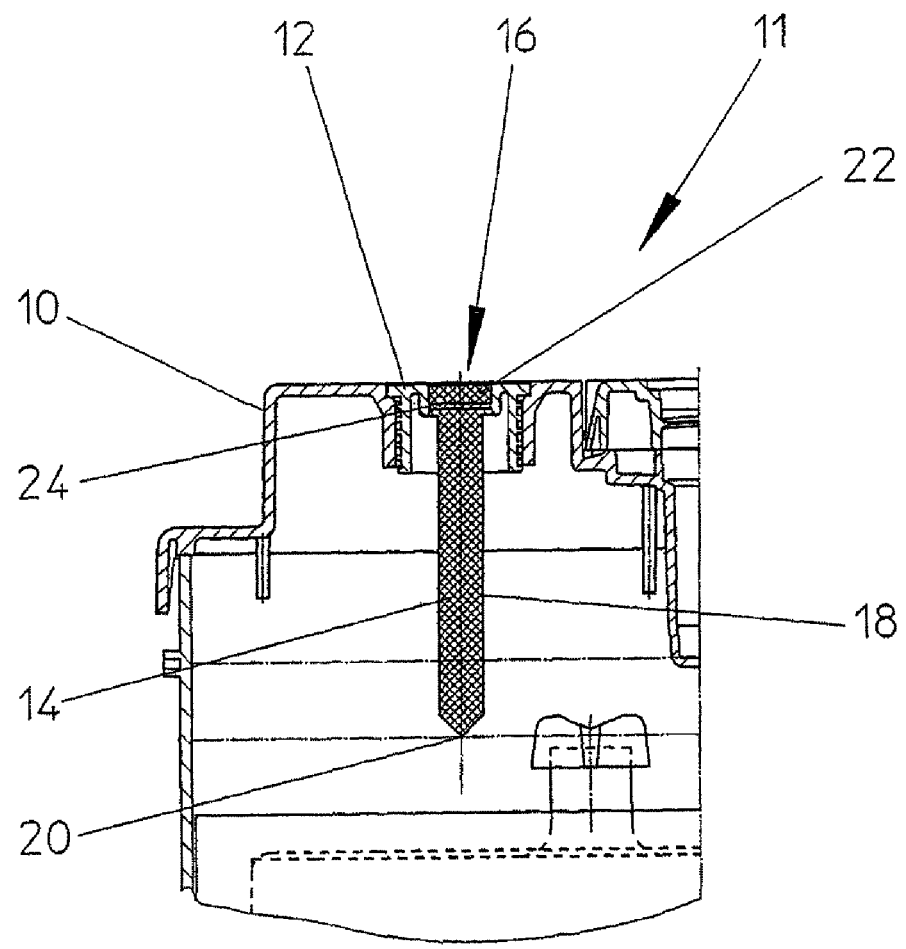

BATTERY ACID STATUS INDICATOR AND METHOD FOR PRODUCTION THEREOF

This application is a national application of PCT/DE2007/01924 which claims priority to and the benefit of German Patent Application DE 10 2006 052 524.8, both of which are incorporated herein by reference.

BACKGROUND AND SUMMARY

The invention relates to an acid status indicator for a battery, in particular for a lead-acid rechargeable battery, having a sight glass and a holder for holding the sight glass and for attaching the acid status indicator to a housing of the battery. According to a second aspect, the invention relates to a battery. According to a third aspect, the invention relates to a method for the production of an acid status indicator and of a battery.

By way of example, acid status indicators are used in lead-acid rechargeable batteries, where they are used to indicate the state of charge. State of charge indicators such as these are based on the effect that the density of an electrolyte in the battery varies as a function of the state of charge of the battery. For this purpose, acid status indicators comprise buoyant bodies whose buoyancy depends on the density of the electrolyte. An indicator apparatus is arranged in the sight glass, determines the buoyancy of the buoyant body, and indicates the state of charge of the battery on this basis. A holder is provided in order to connect the sight glass to a housing in which the other components of the battery are arranged.

DE 298 21 994 U1 describes an acid status indicator in which the sight glass and the holder form an integral component. This has the disadvantage that a plastic which is particularly highly suitable for the sight glass is generally not very suitable as the material for the holder.

In the case of the acid status indicator that is known from DE 298 08 883 U1, the sight glass is welded to the holder. This has the disadvantage that the welding means an additional process step during production, which increases the manufacturing effort.

EP 1 432 061 A1 discloses an acid status indicator in which a sight glass is attached via a holder to a housing of the battery. In order to ensure a good sealing effect between the sight glass and the holder, soft-component seals are provided between the sight glass and the holder. EP 1 633 008 A1 describes a diagnostic probe for a starter battery, in which a sight glass is arranged in a holder on which a seal with a sealing lip, which points radially outwards, is arranged. The seals are disadvantageously subject to aging. Furthermore, the provision of a seal increases the manufacturing effort.

Other acid status indicators are produced by the sight glass being forced under pressure into the holder, thus resulting in an interference fit between the two. During the course of manufacturing the battery, the holder and the sight glass connected to it are then firmly connected to the housing of the battery. It has been found that acid status indicators such as these have the disadvantage that, even when an interference fit is provided, it is not possible to guarantee that the connection between the sight glass and the holder will be acid-tight and gas-tight. For this reason, the gas-tightness and acid-tightness of the acid status indicator must be checked after manufacture of the battery, and this is complex and expensive.

A further disadvantage is that a connection which is initially sealed between the sight glass and the holder can also become leaky when the conditions are not good.

DE 40 07 905 A1 discloses an indicating apparatus for a battery measurement sensor, in which a measurement sensor plate is held in an insert cap, with the measurement sensor plate having a 90° bend in the insert cap, and being held insert-molded in the insert cap.

DE 20 2005 019 009 U1 discloses an insulated battery pole for a lead-acid battery, in which the battery pole is produced by insert-molding of the electrode.

DE 202 20 044 U1 discloses an electrolyte circulating device for a lead-acid rechargeable battery, which has an air guide tube which is surrounded by an elastic sealing sleeve produced by insert molding. The sealing sleeve makes it possible to arrange the air guide tube, forming a seal, in a cylindrical piece, on the inside, of a retaining opening.

DE 78 22 820 U1 discloses a pole bushing for rechargeable batteries. In order to produce a seal with respect to the ingress of electrolyte, the electrode which forms the cell pole is insert-molded with a thermoplastic body.

The invention is therefore based on the object of specifying an acid status indicator which has a gas-tight and acid-tight connection, which can be adjusted in a manner which is reliable from the process point of view, between the sight glass and the holder.

The invention solves the problem by an acid status indicator having the features of claim 1. According to a second aspect, the invention solves the problem by a method for production of an acid status indicator having the features of claim 12.

The invention has the advantage that, as a result of the specific way in which the holder is produced, in a manner which is reliable from the process point of view, this results in a gas-tight and acid-tight connection between the sight glass and the holder. This avoids complex rechecking. Furthermore, it has been found that an acid status indicator produced according to the invention also does not lose its gas-tightness and acid-tightness during use.

Furthermore, the simpler manufacture is advantageous since this avoids the sight glass from being inserted under pressure into the holder. In the conventional manufacturing process, the sight glass and the holder are connected to one another in the cold state. To do this, the sight glass is pushed into the holder under pressure. In order to ensure that there is a contact-pressure force for the interference fit between the two after being pushed in, the sight glass must be elastically compressed and the holder expanded during insertion. Both the expansion and the compression are, however, subject to limits resulting from the strength of the plastics used. The sight glass can thus be inserted only with slight pressure, as a result of which only a relatively small contact-pressure force can be maintained between the sight glass and the holder.

If, according to the invention, the holder is produced by insert molding, then the plasticized plastic is located around the sight glass. On cooling, the plastic shrinks and exerts a strong contact-pressure force on the sight glass. Since the holder is produced by insert molding of the sight glass, this therefore results in a holder which is shrunk onto the sight glass, resting completely on the sight glass. This shrunk-on holder forms a particularly strong, gas-tight and acid-tight interference fit with the sight glass, in which an acid status indicator according to the invention differs from acid status indicators according to the prior art.

Plastics can therefore be used both for the sight glass and for the holder which, because of their brittleness, that is to say because of their small amount of strain to fracture, could otherwise not be used.

In the present description, the expression a sight glass means in particular a component which is used to indicate an acid status, in particular an acid density of the battery. The sight glass is preferably transparent or opaque. When the sight glass enters the acid, it thus appears dark at an end on the housing side, otherwise light. In particular, the sight glass makes it possible to see one or more balls, which are arranged in a ball cage, in order to indicate the acid density.

According to the invention, the sight glass and the holder are produced by two-component injection molding. In particular, this means that the sight glass and the holder are produced in a single two-component injection-molding method step, and in a single injection-molding machine.

In one preferred embodiment, the sight glass is composed of a first plastic and the holder is composed of a second plastic, with the first plastic shrinking less than the second plastic when it cools down. The sight glass and the holder are therefore braced with respect to one another when the plastics cool down, thus advantageously achieving a particularly good sealing effect between the sight glass and the holder. In this case, the shrinkage of the second plastic is preferably at least twice as great as that of the first plastic. The expression shrinkage means in particular the relative decrease in length when a plastic cools down from its plasticizing temperature to room temperature.

In one preferred embodiment, the sight glass comprises styrene/acrylonitrile or is composed of styrene/acrylonitrile.

In one preferred embodiment, the holder comprises polypropylene, and in particular the holder is composed of polypropylene. It is particularly advantageous for the sight glass to be produced from styrene/acrylonitrile and for the holder to be produced from polypropylene using a two-component injection-molding method, since polypropylene shrinks to a far greater extent than styrene/acrylonitrile, thus resulting in a gas-tight and acid-tight acid status indicator which is reliable from the process point of view, for the reasons mentioned above.

In one preferred embodiment, the sight glass has a bead which is surrounded by the holder in an interlocking manner. In this case, it is advantageous for the sight glass to be cylindrical in places and for the bead to be completely circumferential around a cylindrical section such as this. The sight glass is held particularly firmly in the holder by the interlock. Alternatively or additively, the sight glass has a projection which is surrounded by the holder in an interlocking manner. Both the bead and the projection may be completely or only partially circumferential.

The sight glass furthermore preferably has a stepped end in order to indicate of different acid states or levels.

The invention will be explained in more detail in the following text with reference to the drawing, which illustrates a detail of a housing of a battery according to the invention, which is connected to an acid status indicator according to the invention.

BRIEF DESCRIPTION OF THE DRAWING

The FIGURE shows a part of a housing 10 of a battery 11 connected to a holder 12 which holds a sight glass 14.

DETAILED DESCRIPTION OF THE DRAWING

The FIGURE shows a part of a housing 10 of a battery 11 in the form of a lead-acid rechargeable battery. The housing 10 is connected to a holder 12 which holds a sight glass 14. The holder 12 is composed of polypropylene, and the sight glass 14 is composed of styrene/acrylonitrile. The holder 12 and the sight glass 14 are components of an acid status indicator 16.

The sight glass 14 has a cylindrical section 18 which ends at a tip at its one end 20 facing the interior of the housing 10. In alternative embodiments, the cylindrical section 18 ends at a straight end, at a rounded end or at an inclined end.

At its end facing away from the end 20 and facing the housing 10, the sight glass 14 has a head 22 which ends flush with the holder 12. The head 22 has a circumferential bead 24 at its end facing the cylindrical section 18.

The holder 12 surrounds the entire head 22 of the sight glass 14 and an engaging projection on it engages in the bead 24. The holder 12 and the sight glass 14 form a glass-tight and acid-tight interference fit. The bead 24 and the projection which engages in the bead 24 prevent any movement in the axial direction of the sight glass 14 relative to the holder 12, and enhance the sealing effect between the holder 12 and the sight glass 14.

In one alternative embodiment, the head 22 has a circumferential projection at its end facing the cylindrical section 18. In this case, the projection on the head 22 engages in a corresponding bead in the holder, thus enhancing the sealing effect.

In order to produce the acid status indicator 16, when the sight glass 14 has a projection, the sight glass 14 is then injected or injection-molded in an injection-molding machine, which is not shown, first of all with a first plastic, specifically styrene/acrylonitrile. The holder 12 is then injection-molded in the course of a two-component injection-molding method step comprising polypropylene onto the sight glass 14.

If the sight glass has a bead 24, then the holder 12 is advantageously injection-molded first of all, followed by the sight glass 14.

Since they are injection-molded successively, the holder 12 and the sight glass 14 cool at different rates. As a result of these different cooling states and the different chemical composition of the first and second plastics, the styrene/acrylonitrile and polypropylene do not mix but always form two separate phases. The sight glass 14 and the holder 12 are injection-molded such that essentially no inclusions, for example of air, are formed between the two phases.

The acid status indicator 16 which has been created in this way and is in the raw state, is then removed from the mold and is cooled down in the surrounding air. Although styrene/acrylonitrile and polypropylene do not mix but always form two phases, a gas-tight interference fit is created between the sight glass 14 and the holder 12 as a result of the close material contact between the first plastic and the second plastic, and because polypropylene shrinks more than styrene/acrylonitrile.

In a subsequent step, the holder 12 is pushed into the housing 10 and/or is connected to the housing 10 and to the other components of the battery by ultrasound welding, friction welding, laser welding and/or adhesive bonding.

LIST OF REFERENCE SYMBOLS

10 Housing
11 Battery
12 Holder
14 Sight glass
16 Acid status indicator
18 Cylindrical section 20 End
22 Head
24 Bead

The invention claimed is:

1. An acid status indicator for a lead-acid rechargeable battery, having:
   (a) a sight glass (14) having a bead provided about the circumference of the sight glass and a head (22), wherein the bead is disposed in a middle section of the head, spaced apart from an upper end of the head; and
   (b) a holder (12) for holding the sight glass (14) and for attaching the acid status indicator (16) to a housing (10) of the battery (11), the holder having an engaging projection which is received by the bead, wherein the bead is surrounded by the holder (12) in an interlocking manner, thereby preventing any movement in the axial direction of the sight glass (14) relative to the holder (12), the holder and the sight glass being connected to one another by a gas-tight shrink fit,
   wherein the sight glass (14) comprises a first plastic and the holder (12) comprises a second plastic, with the first plastic shrinking less than the second plastic when it cools down.

2. The acid status indicator as claimed in claim 1, wherein the sight glass (14) comprises styrene/acrylonitrile.

3. The acid status indicator as claimed in claim 1, wherein the holder (12) comprises polypropylene.

4. The acid status indicator as claimed in claim 1, wherein the sight glass (14) has a stepped end in order to indicate different acid levels.

5. The acid status indicator as claimed in claim 1, wherein the sight glass (14) has a projection at the lower end, which projection is used to hold a ball cage to indicate the acid density.

6. A lead-acid rechargeable battery, having an acid status indicator (16) as claimed in claim 1.

7. The acid status indicator of claim 1, wherein the sight glass (14) and the holder (12) are two-component injection molding parts, with the holder (12) being an insert mold of the sight glass.

8. An acid status indicator for a lead-acid rechargeable battery, having:
   (a) a sight glass (14) and
   (b) a holder (12) for holding the sight glass (14) and for attaching the acid status indicator (16) to a housing (10) of the battery (11), the holder being shrunk onto the sight glass and resting completely on the sight glass such that the holder and the sight glass are connected to one another by a gas-tight shrink fit.

9. An acid status indicator for a lead-acid rechargeable battery, having:
   (a) a sight glass (14) having a bead provided about the circumference of the sight glass and
   (b) a holder (12) for holding the sight glass (14) and for attaching the acid status indicator (16) to a housing (10) of the battery (11), the holder surrounding the bead in an interlocking manner, the holder and the sight glass being connected to one another by a gas-tight shrink fit.

10. The acid status indicator of claim 8, wherein the sight glass further comprises a head and a bead, wherein the bead is disposed in a middle section of the head, spaced apart from an upper end of the head.

11. The acid status indicator of claim 9, wherein the sight glass further comprises a head, wherein the bead is disposed in a middle section of the head, spaced apart from an upper end of the head.

12. The acid status indicator of claim 10, wherein the bead is surrounded by the holder (12) in an interlocking manner, thereby preventing any movement in the axial direction of the sight glass (14) relative to the holder (12).

13. The acid status indicator of claim 11, wherein the bead is surrounded by the holder (12) in an interlocking manner, thereby preventing any movement in the axial direction of the sight glass (14) relative to the holder (12).

* * * * *